INVENTOR
Horace L. Smith, Jr

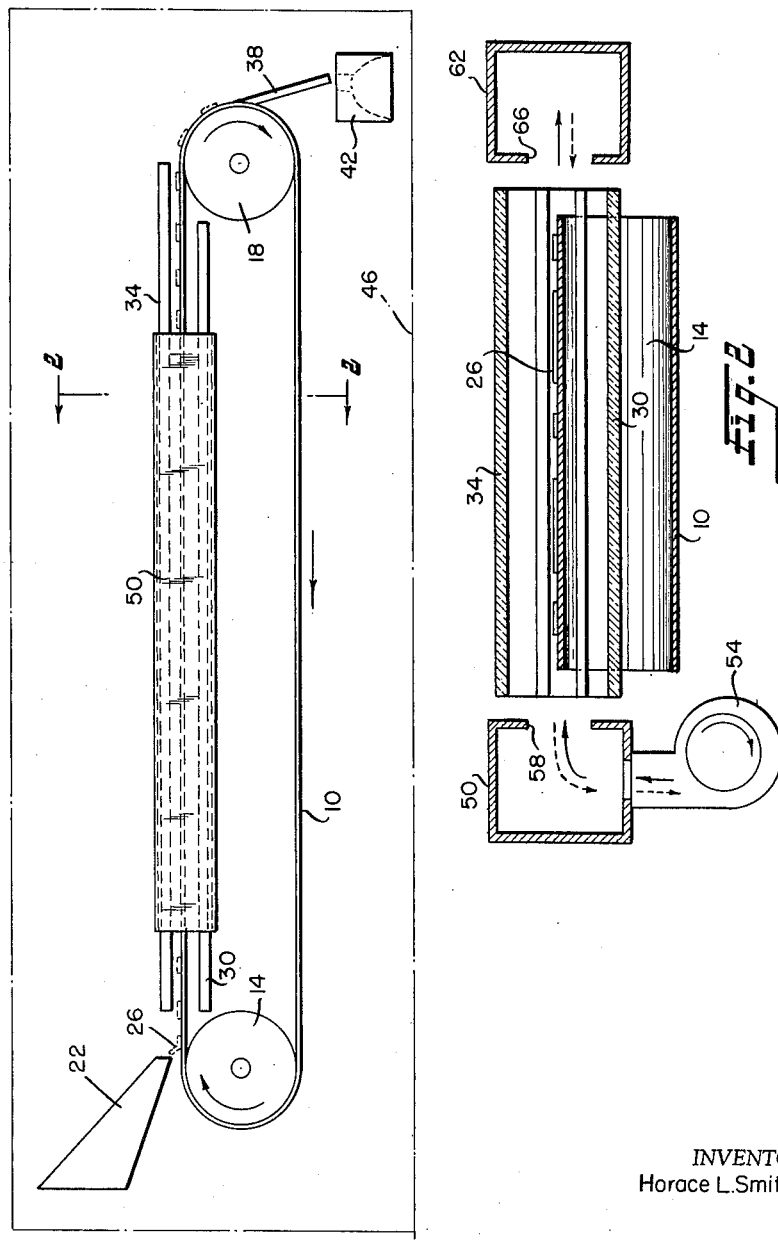

BY Strauch, Nolan & Neale

ATTORNEYS

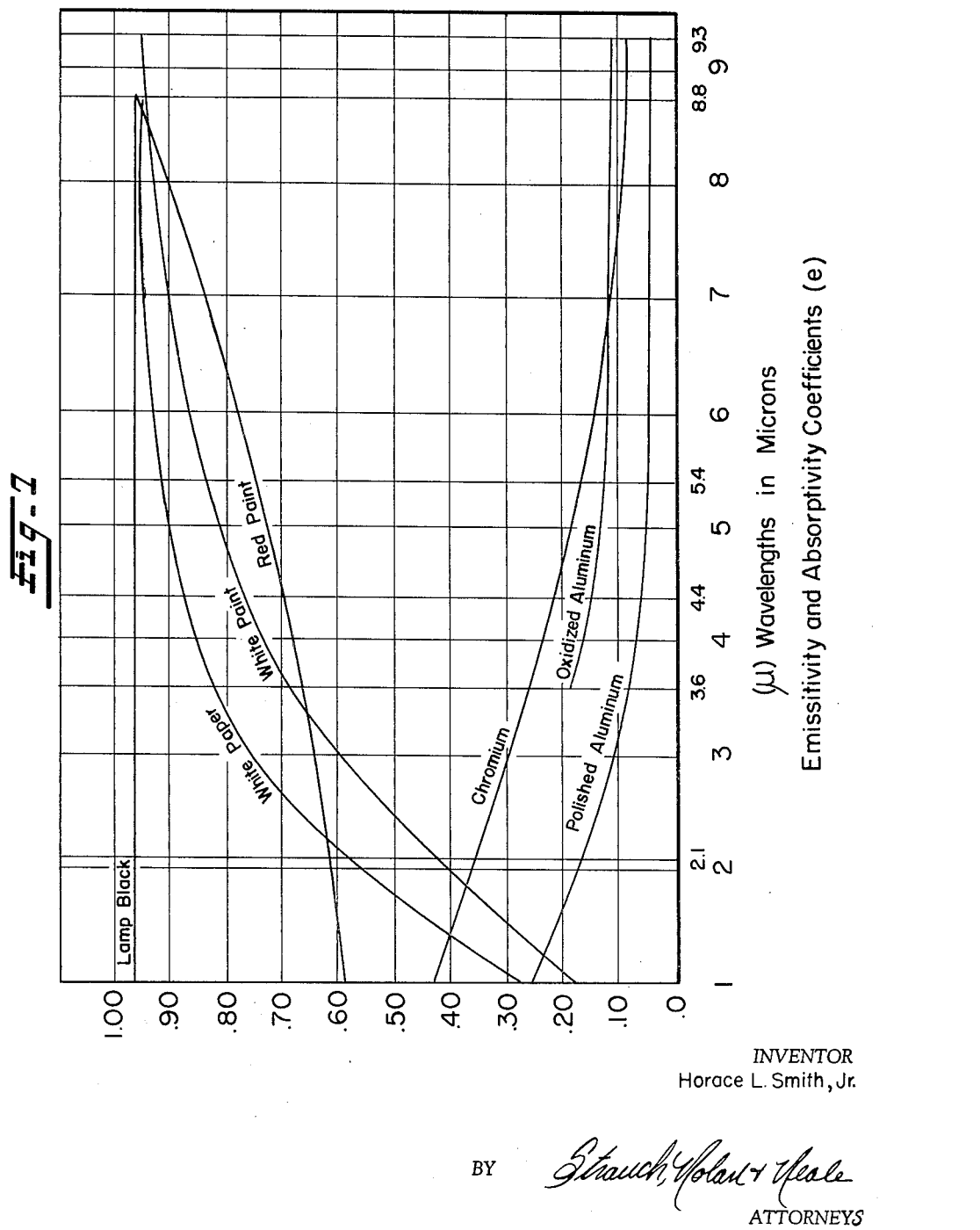

United States Patent Office 3,157,476
Patented Nov. 17, 1964

3,157,476
RADIANT ENERGY HEAT TREATING
IMPROVEMENTS
Horace L. Smith, Jr., Richmond, Va., assignor to Hupp
Corporation, Cleveland, Ohio, a corporation of
Virginia
Filed Nov. 13, 1961, Ser. No. 151,824
8 Claims. (Cl. 34—218)

This invention relates to improvements in radiant energy heat treatment, and more particularly to improvements in methods and apparatus for heating, cooling, curing and drying materials such as foodstuffs, fertilizers, plastics (e.g., extruded or foamed plastics), pharmaceutical materials, culture media and analogous materials, and the like, in preparing them for storage, shipping, and/or consumption. The principles of this invention have wide application, but are eminently illustrated by their utilization in dehydrating processes and apparatus described in detail hereinafter as a preferred embodiment.

Dehydration of such products has been carried out for many years in apparatus including an endless corrosion resistant conveyor belt operating over a pair of spaced rotatable drums passing the product to be dehydrated on the upper traveling surface through a heating zone. Such prior, presently conventional, dehydrating apparatus and techniques are illustrated by way of example in United States Patents 2,924,271, 2,924,272 and 2,924,273 issued to W. E. Conley et al., and my earlier United States Patent 2,515,098. The continuous conveyor belt in such dehydrators operating under either subatmospheric or atmospheric pressures must be flexible, non-rusting, or non-corrodible material, and be capable of withstanding repeated wide temperature variations. Therefore, from a practical standpoint, the only acceptable belt material used extensively to date, is thin flexible stainless steel, and for certain more limited purposes, thin flexible polished aluminum.

In said prior conventional dehydrators the material to be dehydrated is formed into a liquid or semiliquid concentrate and deposited through a feed mechanism in a layer or film of substantially uniform thickness on the conveyor belt which carries the layer under a preheater comprised of a bank of radiant heating elements located between the spaced drums. The steam heated drum supplies most of the latent heat necessary to dry the material, the radiators being present as supplementary heat sources. After drying, the product passes over a cooling drum where its temperature is quickly reduced to facilitate removal from the belt and to prevent loss of flavor and other desired properties.

One of the primary disadvantages of said conventional dehydrators is that the size of the heating drum must be increased if it is desired to increase the capacity of the dehydrator. To eliminate this and other disadvantages the disclosure of my United States Patent No. 2,728,387 supplies all heat necessary for dehydration by radiant heater elements disposed on opposite sides of each leg of the conveyor belt between the spaced apart rotatable drums. A suitable high boiling point heat transfer fluid is circulated through the radiators at a relatively high temperature, but at relatively low pressure as disclosed in this patent which eliminates construction and maintenance of pressurized, steam containers such as the conventional steam heated rotatable drum and the necessary condensate removal and drainage system.

My prior use of radiant heaters as the sole heat source has been a substantial advance in the art. However, it does not utilize the full capabilities of radiant heating primarily due to the low radiation absorptivity of the conveyor belt which has a relatively highly polished radiation reflective surface, and the temperature limitations of the high boiling heat transfer media used in the radiators.

In the prior conventional dehydrating equipment heat is applied to the product by the steam heated rollers or drums through the uncoated inner surface of the conveyor belt and the temperature of the material coating or layer to be dehydrated is therefore dependent upon the temperature of the drum and the thermal conductivity of the belt. In my improved radiant heating equipment without use of steam the radiant heaters are located on both sides of the conveyor belt and product temperature is governed by the characteristics of the radiators, temperature of the heat transfer media circulated therein, capacity of the product to absorb radiant energy from radiators located on the product supporting outer side of the belt, and capacity of the inner side of the conveyor belt to absorb the impinging radiant energy and to transfer it to the product in the form of heat. The radiation and heat absorptivity of the liquid concentrate is always highly adequate and the radiators radiating directly to the product itself on the outside of the belt supply the heat energy directly to the product. However, radiators positioned inside the endless conveyor belt radiate directly to the polished uncoated metal surface of the belt which is highly reflective of the radiation, and the heat transfer from the inner radiators is therefore very inefficient.

Therefore, the primary object of the present invention and discoveries is improvement of the capacity and efficiency of radiation heated type conveyor belt dehydrators and heat treating equipment without addition of radiant heating capacity. This I accomplish by materially reducing the radiation reflectivity and improving the coefficient of radiant energy absorption of the inner side of the belt opposite the product carrying side so it will absorb radiation at a much higher rate than heretofore, with resultant material increase of the temperature of the belt and the heat supplied to the material layer on the opposite side of the belt without increase of heat input, and by co-ordination of exposure times and temperatures with utilization of improved radiators designed for radiation wave length emissivities providing peak heat transfer co-ordinated with the radiation and heat absorptive characteristics and the ultimate desired characteristics and uses of the end products.

While this novel concept in hindsight may appear obvious, in its most simple application, that it is far from obvious to those of highest skill in this highly active art is shown by their failure, and my own failure during many years of continuous active work in dehydration and radiant treatment of such products, to appreciate the practical possibilities of and need for my present invention.

Other objects and advantages of the present invention will become apparent from the following description, appended claims and accompanying drawings wherein:

FIGURE 1 is a diagrammatic front elevation view of a heat applying apparatus embodying the principles of the present invention;

FIGURE 2 is a side elevation view in section taken along line 2—2 of FIGURE 1;

Figure 3:
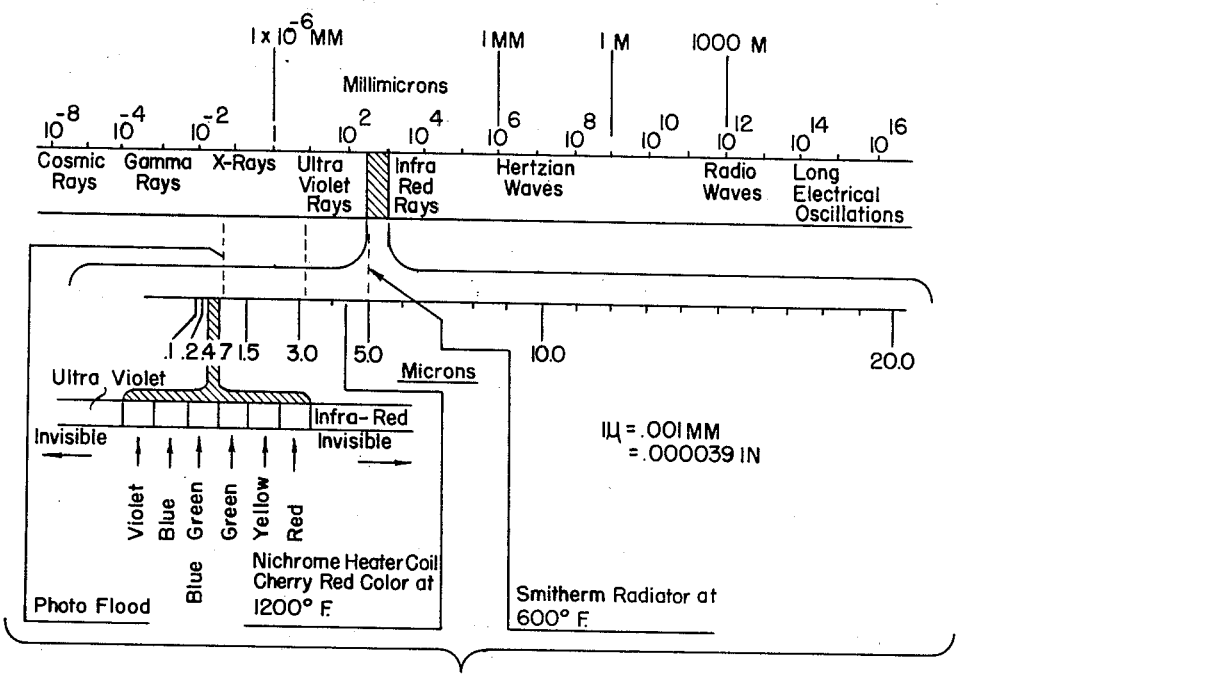
FIGURES 3-6 are diagrammatic representations of certain features of the character of radiant energy necessary to an understanding of the present invention; and, FIGURE 7 is a chart showing emissivity and absorptivity coefficients of various materials for different radiation wave lengths.

Referring now to the drawings, FIGURE 1 illustrates diagrammatically a process and apparatus for applying radiant heat to articles, and more particularly for, dehydrating such articles. A thin endless stainless steel or similar metal belt 10 is trained about a pair of spaced rotatably mounted rollers or pulleys 14 and 18 either one or both of which may be driven in the direction indicated by the arrows thereon by an appropriate source of power (not shown). A dispenser 22 which may be for example, a hopper with control outlet, is located above and adapted to distribute material 26 to be heated, onto the outer surface of belt 10. Radiators 30 and 34 are mounted in the apparatus substantially parallel to a leg of the belt between rollers 14 and 18 and spaced therefrom. Radiators may correspondingly be positioned on the opposite leg of conveyor belt 10 if desired. As the material on belt 10 emerges from between radiators 30 and 34 it is passed over the surface of cooling drum 18, scraped from the belt by doctor blade 38 or other suitable means, and delivered to hopper 42. Radiators 30 and 34 may be of any well known type, such for example as the well known "Smitherm" type of relatively low temperature radiant heater disclosed generally in said prior United States Patent 2,728,387, and of which improved embodiments are disclosed in my copending application Serial No. 64,965, filed October 25, 1960, and entitled Paper Drying System, Apparatus and Method, and various types of primary air and pre-mix radiant gas heaters such as the well known "Perfection Schwank" burners, both sold by the Hupp Corporation of Cleveland, Ohio, and other well known types depending upon the products to be treated.

The dehydrating apparatus may be enclosed in a housing 46 (shown in phantom lines in FIGURE 1) if it is desired to carry out the dehydration in a subatmospheric environment. The water vapors resulting from the drying may be removed from the enclosure by any of several conventional methods for example, by the employment of steam jets, absorption by a dried desiccant such as silica gel, by collection on refrigerated surfaces upon which they will freeze, or by condensation by sprays of refrigerated lithium chloride or other low vapor pressure condensing liquid as described in my United States Patent No. 2,728,387.

Instead of providing a desiccant however, and to improve the speed and longevity of operation without shutdown, may also provide cross ventilating means for removing vaporized or sublimated substances from the heating zone between radiators 30 and 34. As shown diagrammatically in FIGURE 2 this may for example be accomplished for certain types of products by providing an air or gas plenum 50 extending substantially throughout the length of a leg of belt 10. One side of plenum 50 receives the gas or air from any suitable source such as blower 54 and guides it as indicated by the solid line arrows out opening 58 across the heating zone. Plenum 62 on the opposite side of belt 10 collects the vapor laden gases as they emerge from between the radiators through opening 66 and conducts them to exhaust. Or where desirable blower 54 may be reversed to apply suction to plenum 50 thereby reversing the gas and vapor flow as shown in the dotted line arrows in FIGURE 2 so that plenum 62 becomes the inlet and 50 becomes the outlet plenum. And in operations where subatmospheric treatment is desirable the admission of air or gases through the inlet plenum may be restricted or muffled, as desired, for example to prevent ignition of flammable vapors while using radiator temperatures far above the vapor ignition temperature.

Depending upon the material being treated and the results desired, the cross ventilating means may be divided into sections and air or gas at different temperatures supplied or recirculated in the individual sections.

Thus, as material 26 emerges from hopper 22 volatilization will be carried out at a relatively rapid rate and it may be desirable to remove the products of vaporization by cross ventilation, without reducing the material temperature, and with the aid of additional convection heating of the materials when desirable. Therefore, air or gas supplied in this section may be preheated up to approximately or above the vaporizing temperature of the most readily volatilizable substance carried by material 26.

The speed of the material through the apparatus and of the treating temperatures, are predetermined to dry or cure the material to the desired state. At the area of belt discharge the material may be cooled if desired by means of a coolant circulated in roll or drum 18 as shown in my United States Patent No. 2,728,387. However, in accordance with this invention cool gas may also be circulated across belt 10 to cool material 26 in the vicinity of roller 18 if desired to eliminate or reduce the need of circulating a coolant in the roller. Substantially uniform coolant temperatures may be applied throughout the contact surface of the belt and drum by providing countercurrent coolant flow channels in the drum as disclosed in my copending United States application Serial No. 118,439, filed June 20, 1961, for Heat Transfer and Pressure Applying Apparatus and Method of Manufacture Thereof.

To make the optimum selections of my improved belt coatings requires a thorough understanding of radiant heat. As is generally known radiant energy is transferred by electromagnetic vibrations which travel through space at the speed of light, i.e. 186,000 miles per second, and may be regarded as a form of wave motion in which the length of the waves vary according to the temperature of the radiating source. It is however less generally known that for any given black body temperature, most of the energy is emitted in a rather narrow wave length band although some energy is given off in bands of both shorter and longer wave lengths.

FIGURE 3 shows a logarithmic scale that covers the wave length of the entire electromagnetic spectrum from cosmic rays in the extreme short wave length band to long electrical oscillations. The shaded area in this figure between the ultra-violet and infra-red rays has been expanded to show a portion of the scale from 0.1 micron to 20 microns. The entire visible spectrum is included in the narrow band of 0.4 to 0.7 micron and this in turn has been expanded to show the color spectrum from ultra-violet to infra-red. For any given radiation approximately 25% is of shorter, and 75% of the energy is at longer wave length than the wave length of peak or maximum energy radiation.

Figure 4:
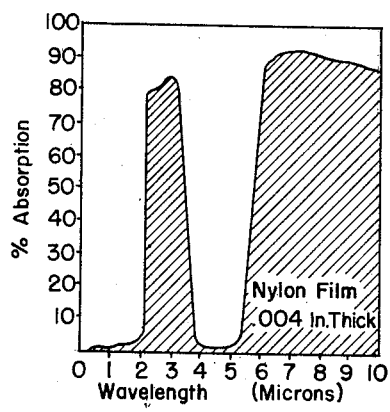

As illustrated in FIGURES 3 and 4, the higher the temperature of the radiator, the shorter the length of the waves given off. The maximum value of radiation intensity, or peak energy emission, varies according to the absolute temperature of the heated radiating body, and an increase in temperature will result in the peak of the energy distribution curve being displaced to shorter wave lengths. FIGURE 4 shows the relative amount of energy radiated from a surface at 300° F. and at 600° F. It also illustrates the effect of a change in temperature of the radiating body; at 300° F. the wave length at the peak of the energy curve is 6.9 microns whereas it is 4.93 microns at 600° F.

According to the Stefan Boltzmann law, the total amount of energy radiated from a body at a given temperature varies as the fourth power of its absolute temperature. In the application of this law, it is necessary to know the surface temperature and condition of the surface, that is, the emissivity coefficient. In the equations of Max Planck there is involved a concept of the "black body" which is defined as a body which absorbs all radiation of all wave lengths falling upon it, and reflects none. Such a theoretical "black body" also radiates the largest amount of energy possible at any given temperature and its emissivity coefficient is therefore unity. It is not practically possible to have a radiating surface that has an emissivity coefficient of one, but it is possible to obtain an emissivity coefficient in the order of 0.95. A highly polished reflecting surface, such as a mirror or polished metal surface reflects most of the radiant energy falling upon it, therefore, its emissivity is very low and can be in the order of 0.05, which means that it would radiate only 5% as much energy as a black body at the same temperature. A surface having an emissivity of 0.95, however, would radiate 95% of the energy that a perfect black body would give off.

Figure 5:
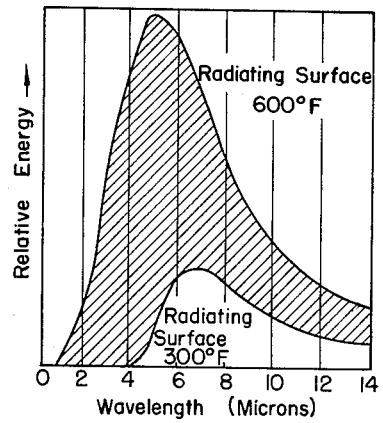
Figure 6:
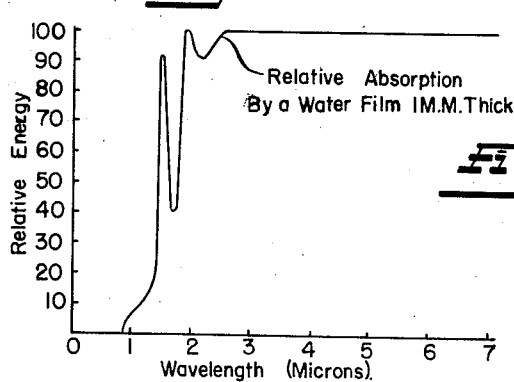

Probably the most obscure and least understood phenomena in connection with the application of radiant heat is the way that radiant heat is absorbed or rejected from a material that is to be heated or cooled. A typical example illustrating this point is shown in FIGURE 5 wherein the rate of radiant energy absorption by a film of nylon 0.004 inch thick is diagrammed. The hatched area shows the percent absorption. The energy radiated at a wave length of 6 microns or longer is absorbed readily by the nylon, but if the peak of the radiant energy is at wave length of 4½ microns very little of the energy is absorbed. If it were possible to radiate energy in a very narrow band of from 2.5 to 3.5 microns then again the rate of absorption would be relatively high. FIGURE 6 illustrates the absorptivity of another material, a film of water 1 mm. thick. Every material has an absorption curve of somewhat different configuration, as illustrated by FIGURES 5 and 6.

In accordance with the present invention, the efficiency of radiant heat applying apparatus such as the dehydrator shown in FIGURE 1 is improved by enhancing the absorptivity of the conveyor belt upon which the material being dehydrated or treated is supported, and by the selection of radiant heat radiating at an optimum peak wave length. This I accomplish by coating the inside of the conveyor belt with a suitable heat resistance material which increases the radiation absorption and emissivity coefficients of the belt surface, will effectively transfer the absorbed heat by conduction of heat through the belt to the outer material supporting surface, and which will adhere for a reasonable time to the belt through bending use and wide variations in temperatures. Such coating finishes may be applied in any suitable manner, as by chemical means, such as anodizing, applied by brushing, spraying, or rolling, and subsequently baked or heat treated or electrically deposited on the belt surface. Examples of suitable coatings may be the colored silicone varnishes, lamp black applied in a vehicle, black enamel, lacquer or shellac; and a particularly desirable coating for many uses may be applied to the belt in accordance with the ebonizing process disclosed in United States Patent No. 2,394,899 which provides a smooth, black oxide film or skin about one-hundred-thousandth of an inch thick to the surface of either chromium-nickel or chromium stainless steel belt materials. This blackened "skin" which retains the corrosion resistance of stainless steel is applied, after conventional cleaning steps of the parts to be treated, by immersing the parts in a molten bath of dichromates at a temperature of 730 to 750° F. for approximately 15 to 30 minutes, followed by cooling and rinsing.

FIGURE 7 illustrates the importance of selecting a proper coating material for the belt. Thus, in higher temperature and therefore shorter wave length uses, white paint has a low absorptivity and would not improve the characteristics of chrome or aluminum finished materials. However, where the peak radiation incidence is of comparatively long wave length (e.g., 5–8.8 microns) white paint would effectively improve the absorption property of chrome or aluminum finished article. Red paint has a higher absorptivity coefficient for radiation of 1–3.4 microns than does white paint but a lower absorptivity coefficient for radiation having a wave length of 3.4–8.8 microns even though darker hued materials are generally considered to absorb better than light materials at all wave lengths. Lamp black provides an absorptivity coefficient of .95 or higher, and in a silicone varnish vehicle is therefore also an excellent coating material in any wave length range. I have also discovered that very thin glass frit enamels available commercially fused to a metal surface provide coatings having absorptivity coefficients up to 0.98 that are durable in use and will withstand relatively high temperatures without substantial impairment of heat transfer through the metal, which can be separated from the metal base only with great difficulty if at all, and which will retain their integrity as a highly emissive and absorptive surface for relatively long time periods. Such coatings are desirable as surface coatings for the conveying belts as well as radiating and cooling equipment.

Accordingly, the selection of coating materials may be made which will provide good results within particular temperature operating ranges but which will be more or less effective outside the particular operating range due to its absorptivity character. Optimum coatings may therefore be selected in correlation with contemplated exposure times and temperatures to give best radiant heating results for particular materials. Where a coating is selected with a high absorptivity coefficient for a given range of radiating temperatures, but has a much lower coefficient at high temperatures, a built in safety feature is provided for treatment of materials which must not be over heated or which are combustible when heated in air beyond the ignition temperature.

In the manufacture of thin plastic films, as from polyethylene, cellophane, and many other well known materials, the plastic is usually cast from an extruder dye onto a highly polished cylinder or polished belt surface. If the film product is to be heated, as where solvent must be removed, application of radiant heat to the film carried on a belt coated on the outer side in accordance with this invention, has several advantages over the present process utilizing a polished cylinder. For example, the cost of equipment for any specified heat transfer rate is much less for the belt than for a heated cylinder, temperature may be controlled more easily throughout the length of the drying cycle and the cross ventilation techniques discussed above may be utilized to effect efficient removal of the volatiles, and sensible heat may be removed from the product by subjecting the plastic and conveyor belt to cooling apparatus such as radiators having a coolant liquid circulated therein. Where evaporation of a solvent is unnecessary, sensible heat may be removed by chilling the film.

Paper may also be heated or cooled more effectively on a belt having a high absorptivity coating. For example, a very high gloss paper is currently made by drying it in contact with a highly polished chrome plated cylinder, whereas, according to this invention the speed of such process can be greatly increased by using a highly polished stainless steel or chrome plated belt for example, for contacting the product, the back side of said belt being treated to have an emissivity coefficient.

Since a surface that has a high emissivity and absorptivity coefficient will also have an emissivity of the same value, chilling material on a conveyor belt, or on a cylindrical surface, may be carried out in accordance with this invention, more efficiently and quickly than heretofore possible when highly emissive coatings are applied to the conveyor. By circulating coolant through radiators 30, the treated belt surface will give off heat to the cooler at a much higher rate than it would if not coated with a highly emissive substance.

The invention may be embodied in other specific forms without departing from the spirit of essential characteristics thereof. The present embodiments are therefore to be considered in all respects as illustrative and not restricted, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Radiant energy heat treating apparatus comprising a thin endless metallic heat conductive flexible corrosion resistant carrier belt having a highly polished radiation reflective low emissivity outer material-carrying surface and an inner heat conductive, highly radiation absorptive and emissive surface comprised of a glass frit enamel coating and material-bearing and return legs; temperature modifying means disposed on opposite sides of at least one of said legs adjacent each of said belt surfaces; means for driving said belt between said temperature modifying means; means for feeding a relatively thin layer of material to be treated to said belt adjacent one end of said material-bearing leg; means for removing the treated material; and means for removing the vapors and gases evolved from said material in its passage between said temperature modifying means whereby substantial increased efficiency of radiant energy utilization is attained.

2. Radiant energy heat treating apparatus as defined in claim 1, wherein said temperature modifying means comprise radiant heaters.

3. The apparatus as defined in claim 1 wherein said glass frit is applied to the material supporting side of said belt.

4. The radiant energy heat treating apparatus as defined in claim 1 wherein said temperature modifying means are means for absorbing heat to cool the material being treated.

5. Radiant energy heat treating apparatus as defined in claim 4 wherein said heat absorbing means are radiator means having a coolant fluid circulated therein.

6. The radiant energy heat treating apparatus as defined in claim 1 wherein said means for removing the treated material from said material carrying surface is located at the opposite end of said belt from said material feeding means.

7. The radiant energy heat treating apparatus as defined in claim 1 wherein said temperature modifying means have a thin coating of a glass frit on the exterior heat transfer surfaces thereof.

8. The radiant energy heat treating apparatus as defined in claim 1 wherein said means for removing the vapors and gases comprise a plenum and a blower located at the opposite ends of said belt.

References Cited by the Examiner

UNITED STATES PATENTS

| | | | |
|---|---|---|---|
| 1,469,316 | 10/23 | Hartshorn. | |
| 2,156,845 | 5/39 | Gentele | 34—4 X |
| 2,360,257 | 10/44 | Muller et al. | 198—193 X |
| 2,728,387 | 12/55 | Smith | 159—12 |
| 2,783,618 | 3/57 | Mills. | |
| 2,986,387 | 5/61 | Illing | 198—193 X |

FOREIGN PATENTS

| | | |
|---|---|---|
| 659,333 | 10/51 | Great Britain. |
| 661,744 | 11/51 | Great Britain. |

NORMAN YUDKOFF, *Primary Examiner.*